United States Patent [19]

Stephens

[11] 4,087,125

[45] May 2, 1978

[54] CARGO VEHICLE

[76] Inventor: C. W. Stephens, 51 Osage Ave., Kansas City, Kans. 66105

[21] Appl. No.: 736,125

[22] Filed: Oct. 27, 1976

[51] Int. Cl.² ............................................. B62D 39/00
[52] U.S. Cl. .................................... 296/24 B; 98/2.11
[58] Field of Search ................... 296/24 B; 98/2, 2.11, 98/2.14, 2.15

[56] References Cited

U.S. PATENT DOCUMENTS

| | | | |
|---|---|---|---|
| 1,448,183 | 3/1903 | Bang | 246/24 B |
| 2,150,624 | 3/1939 | Johnson | 296/24 B |
| 3,057,284 | 10/1962 | Learmont | 296/24 B |

*Primary Examiner*—Philip Goodman

*Attorney, Agent, or Firm*—Fishburn, Gold & Litman

[57] ABSTRACT

A refrigerated cargo vehicle has components therein effective to uniformly distribute cooling air throughout a cargo body which is divided into a plurality of compartments including a center compartment by a plurality of longitudinally spaced partitions extending transversely between opposite side walls of the cargo body. Laterally spaced walls extend longitudinally from each end wall of the cargo body and terminate at the respective partitions defining the center compartment thereby defining upwardly opening passages each communicating with respective opposite end portions of a duct extending between and through the partitions defining the center compartment.

10 Claims, 5 Drawing Figures

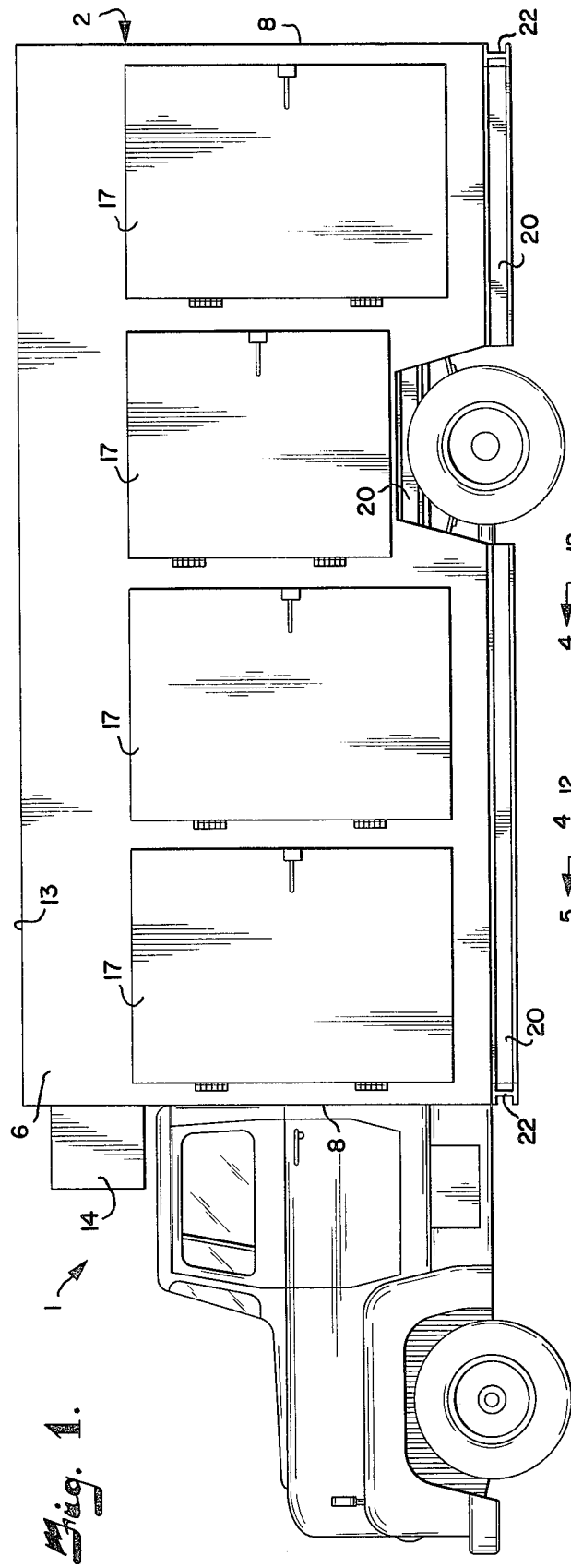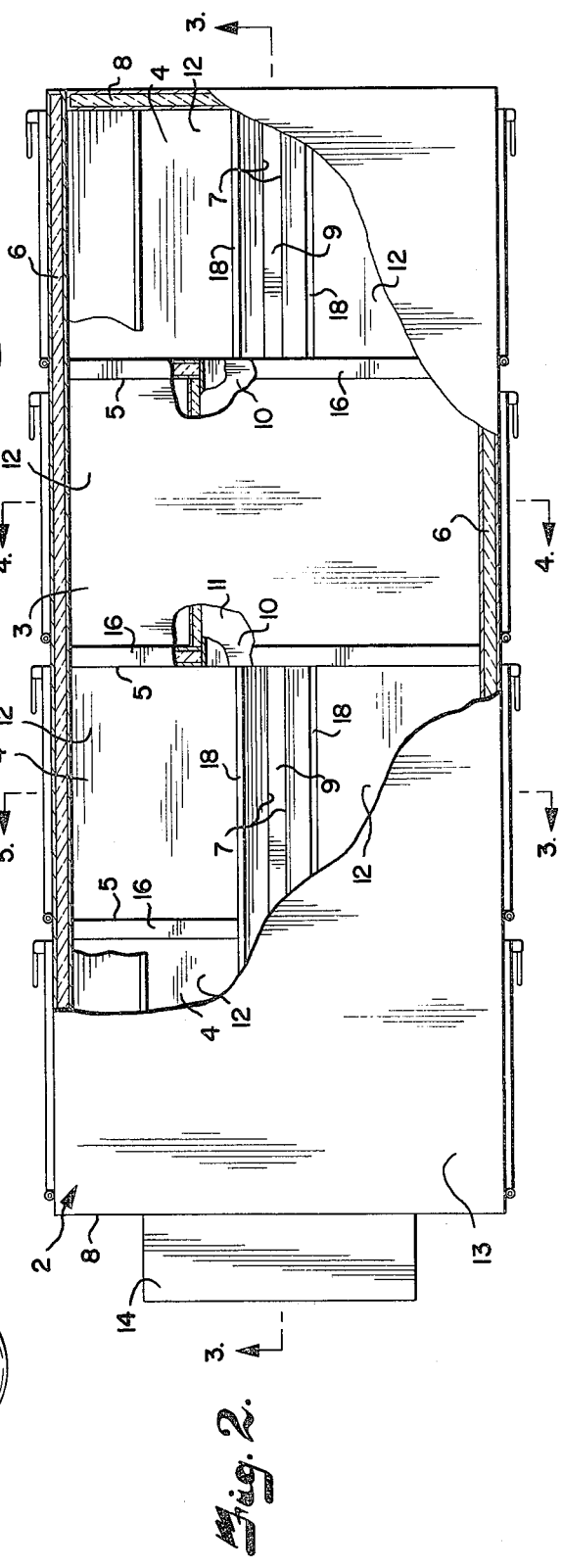

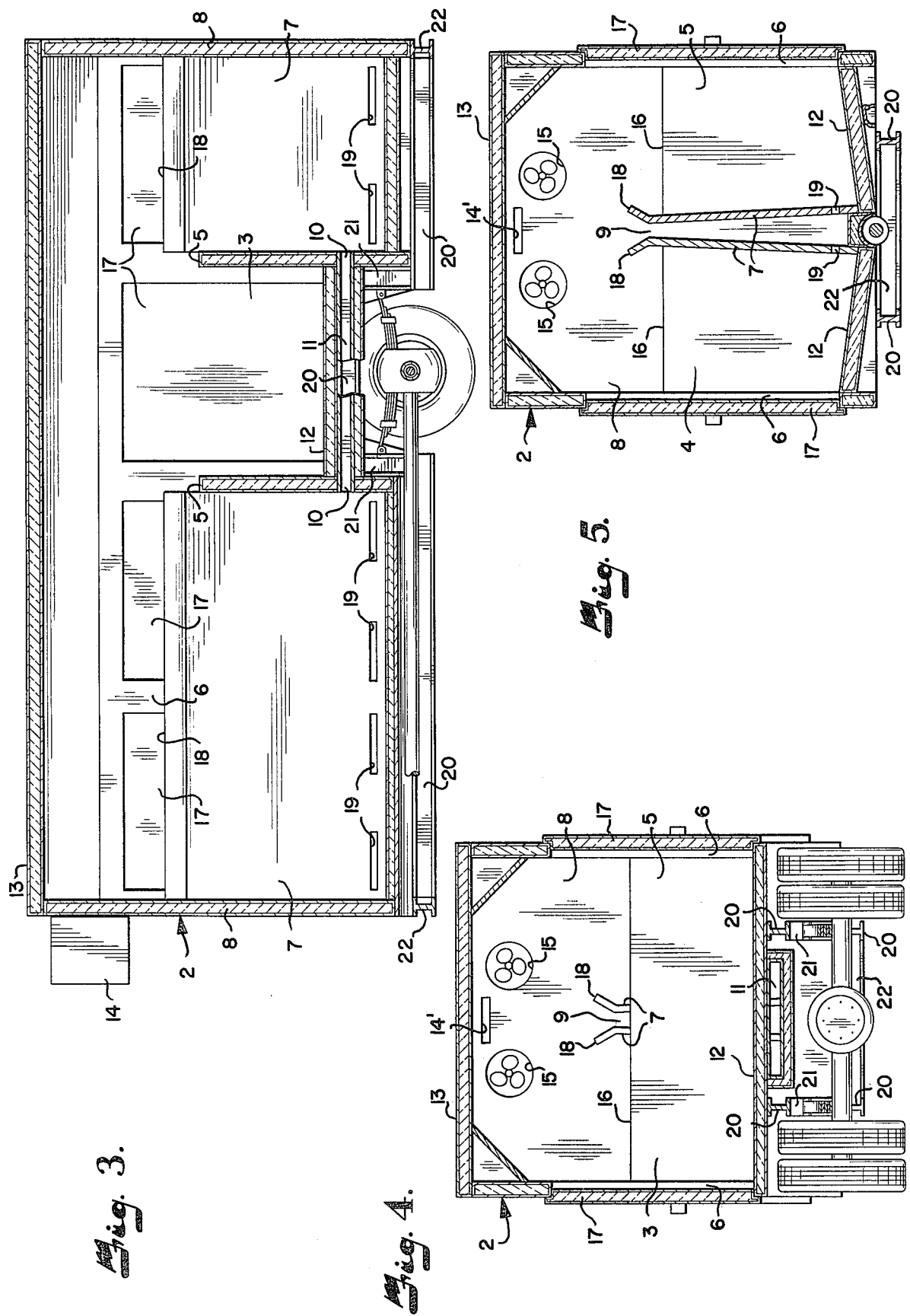

CARGO VEHICLE

The present invention relates to cargo vehicles and more particularly to a cargo vehicle having upwardly opening passages each communicating with respective portions of a duct extending between and through partitions for uniformly distributing cooling air throughout a cargo body.

The principal objects of the present invention are: to provide a cargo vehicle having components therein effective to uniformly distribute cooling air throughout a cargo body divided into a plurality of compartments including a center compartment; to provide such a cargo vehicle wherein the components are effective to rapidly return the temperature within the cargo body to within a selected low temperature range, such as just above freezing, when an access door to any of the compartments is opened and then later closed; to provide such a cargo vehicle having upwardly opening longitudinally extending passages in each of the compartments except a center compartment where a longitudinally extending duct has opposite end portions thereof communicating with each of the upwardly opening passages; to provide such a cargo vehicle wherein the passages are defined by laterally spaced walls extending upwardly from a cargo body floor and terminating below a cargo body roof and each having a plurality of longitudinally spaced ports therein for flow of cooling air into the adjacent compartment; to provide such a cargo vehicle wherein the duct in the center compartment is below the floor in the center compartment and above the floor in the other or end compartments whereby cooling air may flow between opposite ends of the cargo body; and to provide such a cargo vehicle which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the cargo vehicle.

FIG. 1 is a side elevational view of a cargo vehicle embodying features of the present invention.

FIG. 2 is a top plan view of the cargo vehicle with portions broken away to better illustrate the components therein.

FIG. 3 is a longitudinal sectional view taken on line 3—3 of FIG. 2.

FIG. 4 is a transverse sectional view through a center compartment and taken on line 4—4 of FIG. 2.

FIG. 5 is a transverse sectional view through another compartment and taken on line 5—5 of FIG. 2.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a refrigerated cargo vehicle having components therein effective to uniformly distribute cooling air throughout a cargo body 2 divided into a plurality of compartments including a center compartment 3 and other or end compartments 4 by a plurality of longitudinally spaced partitions 5 extending transversely between opposite side walls 6 of the cargo body 2. When an access door to any of the compartments 3 and 4 is opened allowing entrance of warm air into one compartment and later closed, the components within the cargo body 2 are effective to rapidly return the temperature in the compartments 3 and 4 to within a selected low temperature range, such as just above freezing. Laterally spaced walls 7 extend longitudinally from each end wall 8 of the cargo body 2 and terminate at the respective partitions 5 defining the center compartment 3 thereby defining upwardly opening passages 9 each communicating with respective opposite end portions 10 of a duct 11 extending between and through the partitions 5 defining the center compartment 3.

The cargo vehicle 1 may be a trailer or a self-propelled vehicle as illustrated and is particularly useful for transportation of items which are maintained at a selected range of low temperatures, such as just above freezing. The cargo body 2 is suitably insulated and has a floor 12 and the opposite end walls 8 and opposite side walls 6 extend upwardly from the floor 12. A roof 13 is connected to the end and side walls and encloses a storage space which may be maintained at a selected temperature range by cooling means.

In the illustrated embodiment, the cooling means is mounted on one of the end walls 8, for example a front wall, and is operative to remove warm air from and to direct cooling air into the cargo body 2. A suitable cooling unit 14 is mounted on an exterior surface of the front end wall 8. A warm air return vent 14' and a plurality of discharge ports 15 are formed in the front end wall 8. Suitable flow directing means, such as louvres, fans, or the like, may be mounted in the discharge ports 15, as desired.

The partitions 5 each extend between the opposite side walls 6. The partitions 5 each extend upwardly from the floor 12 and each has an upper edge 16 spaced below the lower surface of the roof 13 so that cooling air from the cooling unit 14 may flow over the partitions 5 and into each of the compartments in the body 2.

The partitions 5 are positioned to define the center compartment 3 and at least one other compartment 4 on each side thereof. In the illustrated embodiment, there is one end compartment 4 between the center compartment 3 and the rear end wall 8 and there are two other or end compartments 4 between the center compartment 3 and the front wall 8 of the cargo body 2.

Each of the side walls 6 has a plurality of doors 17 therein each providing access to a respective one of the compartments 3 or 4 within the cargo body 2. Each of the doors 17 is suitably insulated to maintain the cargo body 2 at a selected low temperature, such as just above freezing.

The passages 9 in the other compartments 4 provide means for longitudinal flow of cooling air. The passages 9 are each upwardly open so that cooling air may enter same from above and flow toward the floor 12 of the respective compartment 4. The passage walls 7 are arranged as a transversely spaced pair extending upwardly from the floor 12 of the cargo body 2. The passage walls 7 each have an upper edge 18 spaced below the lower surface of the roof 13 and thereby receive cooling air from the cooling unit 14.

The pair of passage defining walls 7 for each of the compartments 4 except the center compartment 3 are positioned intermediate the opposite side walls 6 of the cargo body 2 and each on a respective side of and equally spaced from a centerline or longitudinal axis of the cargo body 2 thereby defining first and second side portions in each of the other compartments 4 within the cargo body 2.

The pair of passage defining walls 7 each have means defining a plurality of longitudinally spaced ports 19 therein for flow of cooling air into the respective first and second compartment side portions thereby providing means for circulation of cooling air throughout the other compartments 4 within the cargo body 2.

The duct 11 has the opposite end portions 10 thereof extending through the partitions 5 defining the center compartment 3 and communicating with the passages 9 in the adjacent other compartments 4. In the illustrated embodiment, the duct 11 is below the floor 12 of the center compartment 3 which in turn is above the cargo body floor 12 in each of the other compartments 4. The duct 11 is preferably enclosed within suitable insulation to maintain the temperature of the air in the duct within a selected range, such as just above freezing.

The floor 12 of the center compartment 3 is substantially level and extends between the opposite side walls 6. The floor 12 in each of the other compartments 4 slopes downwardly and inwardly from the respective side walls 6 toward the respective passage defining walls 7 whereby cargo placed in the first and second side portions of each of the other compartments 4 is retained therein by gravity.

The cargo body 2 includes a suitable frame for supporting the different levels and slopes of the body floor 12. In the illustrated embodiment, the frame includes a pair of laterally spaced frame side members 20 each having front and rear portions below the other compartment 4 and a center portion below the center compartment 3. The frame includes upright members or portions 21 extending between the center portion and the respective front or rear portion of the side member 20. The frame also includes suitable end members 22 positioned below the respective cargo body end walls 8 thereby defining a substantially rigid structure.

The structure of the cargo body 2 permits equalization of temperature within the other or end compartments 4. Opening of any of the doors 17 allows entrance of warm air into the opened compartment thereby raising the temperature therein which in turn activates the cooling unit 14. Cooling air from the cooling unit 14 and the ports 15 in the front end wall 8 flows into the front end compartment 4 and a portion of the cooling air enters the passage 9 and flows toward the adjacent end portion 10 of the duct 11. Cooling air flows through the duct 11 under the center compartment 3 and into the passage 9 within the rear compartment or compartments 4. The air flows outwardly through the ports 19 in the passage defining walls 7 and into each of the first and second side portions of the front and rear other compartments 4.

Cooling air from the cooling unit 14 and the discharge ports 15 enters each of the center compartment 3 and the other or end compartments 4 by flowing over the partitions 5 and into the respective compartments. However, the center compartment 3 is not maintained at the same low temperature as the other or end compartments 4. Circulation of cooling air is both over the partitions 5 and through the passages 9 and the duct 11 under the center compartment 3 whereby all of the other compartments 4 except the center compartment 3 are maintained at substantially the same temperature.

It is to be understood that while I have illustrated and described one form of my invention, it is not to be limited to the specific form or arrangement of parts herein described and shown.

What I claim and desire to secure by Letters Patent is:

1. A cargo vehicle comprising:
   (a) an elongated cargo body having opposite side walls, a floor, opposite end walls, and a roof;
   (b) means on one of said body end walls for directing cooling air into said cargo body;
   (c) a first partition and a second partition each extending upwardly from said floor and extending transversely between said side walls to define opposite end compartments and a center compartment within said cargo body;
   (d) door means in each of the side walls of said cargo body for access to respective compartments within said body;
   (e) means in each of said end compartments defining a respective upwardly opening passage therein for longitudinal flow of cooling air;
   (f) means extending between said first partition and said second partition defining a duct having opposite end portions thereof extending through said respective partitions and communicating with said respective passages in the end compartments;
   (g) a plurality of ports in lower portions of the means defining said upwardly opening passage for flow of cooling air into respective compartments.

2. A cargo vehicle as set forth in claim 1 wherein said means defining each of said passages includes a pair of transversely spaced walls extending upwardly from said floor and extending between a respective one of said end walls and the adjacent one of said first and second partitions, said passage defining walls each having an upper edge spaced from the roof of said cargo body.

3. A cargo vehicle as set forth in claim 1 wherein:
   (a) said duct is positioned below said floor in said center compartment;
   (b) said floor in said center compartment is above the floor in each of said end compartments; and
   (c) said duct opposite end portions are each above the floor in each of said end compartments.

4. A cargo vehicle comprising:
   (a) an elongated cargo body having opposite side walls, a floor, opposite end walls, and a roof;
   (b) means on one of said body end walls for directing cooling air into said cargo body;
   (c) a first partition and a second partition each extending upwardly from said floor and extending transversely between said side walls to define opposite end compartments and a center compartment within said cargo body;
   (d) door means in each of the side walls of said cargo body for access to respective compartments within said body;
   (e) means in each of said end compartments defining a respective upwardly opening passage therein for longitudinal flow of cooling air;
   (f) means extending between said first partition and said second partition defining a duct having opposite end portions thereof extending through said respective partitions and communicating with said respective passages;

(g) said means defining each of said passages including a pair of transversely spaced walls extending upwardly from said end walls and the adjacent one of said first and second partitions, said passage defining walls each having an upper edge spaced from the roof of said cargo body;

(h) said pair of spaced passage defining walls for each of said end compartments within said body are positioned intermediate the side walls of said body thereby defining a first compartment portion and a second compartment portion each of said end compartments within said cargo body; and (i) each of said pair of spaced passage defining walls of each of said end compartments within said body includes means defining a plurality of ports for flow of coolings air into said respective first and second compartment portions.

5. A cargo vehicle comprising:
(a) an elongated cargo body having opposite side walls, a floor, opposite end walls, and a roof;
(b) means on one of said body end walls for directing cooling air into said cargo body;
(c) a first partition and a second partition each extending upwardly from said floor and extending transversely between said side walls to define opposite end compartments and a center compartment within said cargo body;
(d) door means in each of the side walls of said cargo body for access to respective compartments within said body;
(e) means in each of said end compartments defining a respective upwardly opening passage therein for longitudinal flow of cooling air;
(f) means extending between said first partition and said second partition defining a duct having opposite end portions thereof extending through said respective partitions and communicating with said respective passages;
(g) said means defining each of said passages includes a pair of transversely spaced walls each on a respective side of and spaced from a longitudinal center-line of said body;
(h) said passage defining walls each extend upwardly from said body floor and longitudinally between a respective one of said body end walls and the adjacent one of said first and second partitions;
(i) said passage defining walls each have an upper edge spaced from said body roof; and
(j) said passage defining walls each include means defining a plurality of ports therein for flow of cooling air into a space between said respective passage defining wall and the adjacent body side wall.

6. A cargo vehicle as set forth in claim 5 wherein:
(a) the body floor in each of said end compartments slopes downwardly and inwardly from said respective side wall toward said respective adjacent passage defining wall;
(b) the body floor in said center compartment is substantially level and positioned above the body floor in each of said end compartments;
(c) said duct is positioned below the body floor in said center compartment; and
(d) said duct opposite end portions are each above the body floor in each of said end compartments.

7. A cargo vehicle comprising:

(a) an elongated body having a floor, opposite end walls, opposite side walls, and a roof;
(b) means on one of said end walls for directing cooling air into said body;
(c) a plurality of longitudinally spaced partitions each extending upwardly from said floor and extending transversely between said side walls thereby defining a center compartment and at least one compartment adjacent each end of said center compartment, said spaced partitions each having an upper end spaced below said roof for providing air flow communications between upper portions of said compartments;
(d) door means in each of the side walls of said body for access to said respective compartments within said body;
(e) means in each of said compartments except said center compartment for defining a respective upwardly opening passage therein extending longitudinally of said body for flow of cooling air;
(f) means below the floor in said center compartment defining a longitudinally extending duct having opposite end portions thereof extending through the partitions defining said center compartment and communicating with said respective upwardly opening passages;
(g) a plurality of ports in lower portions of the means defining said upwardly opening passage for flow of cooling air into respective compartments.

8. A cargo vehicle as set forth in claim 7 wherein said means defining each of said upwardly opening passages includes a pair of transversely spaced walls extending upwardly from said body floor and each extending longitudinally between a respective one of said end walls and the adjacent partition defining said center compartment, said passage defining walls each having an upper edge spaced from the body roof.

9. A cargo vehicle comprising:
(a) an elongated body having a floor, opposite end walls, opposite side walls, and a roof;
(b) means on one of said end walls for directing cooling air into said body;
(c) a plurality of longitudinally spaced partitions each extending upwardly from said floor and extending transversely between said side walls thereby defining a center compartment and at least one compartment adjacent each end of said center compartment;
(d) door means in each of the side walls of said body for access to said respective compartments within said body;
(e) means in each of said compartments except said center compartment for defining a respective upwardly opening passage therein extending longitudinally of said body for flow of cooling air;
(f) means below the floor in said center compartment defining a longitudinally extending duct having opposite end portions thereof extending through the partitions defining said center compartment and communicating with said respective upwardly opening passages;
(g) said means defining each of said upwardly opening passages including a pair of transversely spaced walls extending upwardly from said body floor and each extending longitudinally between a respective one of said end walls and the adjacent partition defining said center compartment, said passage defining walls each having an upper edge spaced from the body roof;
(h) said pair of spaced passage defining walls are positioned intermediate the side walls of said body thereby defining a first compartment portion and a second compartment portion in each of said compartments except said center compartment; and
(i) each of said pair of spaced passage defining walls includes means defining a plurality of ports for flow of cooling air into said respective first and second compartment portions.

10. A cargo vehicle comprising:
(a) an elongated body having a floor, opposite end walls, opposite side walls, and a roof;
(b) means on one of said end walls for directing cooling air into said body;
(c) a plurality of longitudinally spaced partitions each extending upwardly from said floor and extending transversely between said side walls thereby defining a center compartment and at least one compartment adjacent each end of said center compartment;
(d) door means in each of the side walls of said body for access to said respective compartments within said body;
(e) means in each of said compartments except said center compartment for defining a respective upwardly opening passage therein extending longitudinally of said body for flow of cooling air;
(f) means below the floor in said center compartment defining a longitudinally extending duct having opposite end portions thereof extending through the partitions defining said center compartment and communicating with said respective upwardly opening passages;
(g) the floor in said center compartment is above the floor in said other compartments; and
(h) said duct opposite end portions are each above the floor in each of said other compartments.

* * * * *